US 9,508,997 B2

(12) United States Patent
Kaeding et al.

(10) Patent No.: US 9,508,997 B2
(45) Date of Patent: Nov. 29, 2016

(54) MEDIA SUPPLY PLATE FOR A FUEL CELL STACK

(71) Applicant: STAXERA GmbH, Dresden (DE)

(72) Inventors: Stefan Kaeding, Zerrenthin (DE); Rainer Grube, Hettstedt (DE)

(73) Assignee: SunFire GmbH, Dresden (DE)

( * ) Notice: Subject to any disclaimer, the term of this patent is extended or adjusted under 35 U.S.C. 154(b) by 37 days.

(21) Appl. No.: 13/741,213

(22) Filed: Jan. 14, 2013

(65) Prior Publication Data

US 2013/0130145 A1 May 23, 2013

Related U.S. Application Data

(62) Division of application No. 12/522,084, filed as application No. PCT/DE2008/000057 on Jan. 14, 2008, now abandoned.

(30) Foreign Application Priority Data

Jan. 16, 2007 (DE) .......................... 10 2007 002 286

(51) Int. Cl.
| | |
|---|---|
| H01M 2/00 | (2006.01) |
| H01M 8/04 | (2016.01) |
| H01M 8/02 | (2016.01) |
| H01M 8/24 | (2016.01) |
| H01M 8/12 | (2016.01) |

(52) U.S. Cl.
CPC ......... *H01M 8/04082* (2013.01); *H01M 8/248* (2013.01); *H01M 8/2465* (2013.01); *H01M 8/2475* (2013.01); *H01M 8/2485* (2013.01); *H01M 8/0258* (2013.01); *H01M 8/2425* (2013.01); *H01M 2008/1293* (2013.01); *Y02E 60/50* (2013.01); *Y02E 60/525* (2013.01); *Y10T 29/49108* (2015.01)

(58) Field of Classification Search
USPC .......................................... 429/513
See application file for complete search history.

(56) References Cited

U.S. PATENT DOCUMENTS

| | | | |
|---|---|---|---|
| 5,993,987 A | 11/1999 | Wozniczka | |
| 6,372,372 B1 | 4/2002 | D'Aleo | |
| 6,541,148 B1 * | 4/2003 | Walsh et al. | ................. 429/434 |
| 2003/0235751 A1 | 12/2003 | Kelly | |
| 2004/0121216 A1 | 6/2004 | Blanchet | |
| 2004/0197630 A1 | 10/2004 | Wilson | |
| 2005/0170235 A1 | 8/2005 | Hu | |

FOREIGN PATENT DOCUMENTS

| | | |
|---|---|---|
| AT | 413 009 B | 9/2005 |
| DE | 101 53372 A1 | 5/2002 |
| DE | 2004060526 A1 | 6/2002 |
| DE | 10334129 A1 | 2/2005 |

(Continued)

*Primary Examiner* — Barbara Gilliam
*Assistant Examiner* — Adam A Arciero
(74) *Attorney, Agent, or Firm* — Patent Central LLC; Stephan A. Pendorf

(57) ABSTRACT

The invention relates to a media supply plate (10) for a fuel cell stack (12) comprising at least one anode gas terminal (14) and at least one cathode gas terminal (16). According to the invention the media supply plate (10) further comprises at least one anode waste gas terminal (18) and at least one cathode waste gas terminal (20). The invention further relates to a fuel cell system (52) using such a media supply plate (10) as well as a method for producing such a fuel cell system.

10 Claims, 6 Drawing Sheets

(56) References Cited

FOREIGN PATENT DOCUMENTS

| | | |
|---|---|---|
| DE | 112005001754T5 T5 | 5/2007 |
| EP | 0783771 B1 | 7/1998 |
| JP | S58-97271 A | 6/1983 |
| JP | H01-232669 A | 9/1989 |
| JP | H04-12469 A | 1/1992 |
| JP | 2001-504632 A | 4/2001 |
| JP | 2002-50391 A | 2/2002 |
| JP | 2002-190312 A | 7/2002 |
| WO | 94/18712 A1 | 8/1994 |
| WO | 98/22990 | 5/1998 |
| WO | 2004/077587 A2 | 9/2004 |
| WO | 2006/024124 A1 | 3/2006 |
| WO | WO2006/024124 * | 3/2006 ............ H01M 2/10 |

* cited by examiner

MEDIA SUPPLY PLATE FOR A FUEL CELL STACK

CROSS-REFERENCE TO RELATED APPLICATIONS

This patent application claims priority from and is a Divisional application of U.S. application Ser. No. 12/522,084, entitled "Media Supply Plate for a Fuel Cell Stack", which was filed on Sep. 17, 2009, which is a U.S. national phase application filed under 35 U.S.C. §371 of International Application No. PCT/DE2008/000057, filed Jan. 14, 2008, designating the United States, which claims priority from German Patent Application No.: DE 10 2007 002 286.9, filed Jan. 16, 2007, which are all hereby incorporated herein by reference in their entirety for all purposes.

SPECIFICATION

The invention relates to a fuel cell system and a method for its production.

Particularly in case of high-temperature fuel cell systems like, for example, SOFC fuel cell systems it is presently common practice to subsequently integrate the separately produced fuel cell stack into the system in which the fuel cell stack is to be operated. Said integration of the fuel cell stacks into the respective systems may be very intricate since, for example, the supply and discharge of the gasses required for the operation of the fuel cell stack have to be ensured. In addition the integration of the fuel cell stack into the respective systems often requires seals between the systems and the fuel cell stack, said seals presenting a potential safety risk if they are leaking, for example if a leakage results in a reformate generated by a reformer not flowing into areas of the system provided therefore.

Furthermore, the fuel cell stack is frequently stacked on a base plate when it is produced to ensure the stability during the production process. The system provided for the operation of the fuel cell stacks also has to be produced so that it is per se stable enough to accommodate the fuel cell stack. This frequently results in the fuel cell stack being positioned on two base plates, its own base plate and a so-called fuel cell adapter plate of the system. This leads to a high weight and high costs.

From EP 0 783 771 B1 the provision of a lower base plate of the fuel cell stack with terminals for a gas supply and of an upper end plate of the fuel cell stack with terminals for a gas discharge is already known. In this case, also, however, the integration of the fuel cell stack into the system provided for its operation is intricate and, in particular, not standardisable if a selection among fuel cell stacks having different heights is required.

The invention is based on the object to enable a simple integration of the fuel cell stacks into the systems provided for their operation.

Said object is solved by the features of the independent claims.

Advantageous embodiments and further developments will become obvious from the dependent claims.

The fuel cell system according to the invention is characterised in that it comprises a media supply plate and a fuel cell stack stacked directly onto the media supply plate, wherein the media supply plate comprises at least one anode gas terminal and at least one cathode gas terminal and having at least one anode waste gas terminal and at least one cathode waste gas terminal. To ensure the required tightness between the media supply plate and the fuel cell stack element provided adjacent to it, for example, glass solder melting on during the joining of the fuel cell stack may be used without that excluding the additional or alternative use of other sealing elements. Since the media supply plate serves as a base plate of the fuel cell stack as well as a system adapter plate in this case the intricate use of two separate base plates is no longer required. The media supply plate comprises all the terminals required for the supply and release of the process gasses, preferably in the form of a defined interface which may, for example, comprise a flange joint comprising set-on pipes and which may readily be reused by the respective operator of the system. The media supply plate may, in particular, advantageously be designed so that the fuel cell stack can be directly stacked onto and joined on the media supply plate during its production so that it is no longer required to provide two base plates. Another advantage is achieved by the interface provided for the supply and discharge of the process gasses being independent of the respective height of the fuel cell stacks.

In connection with the fuel cell system according to the invention it may be contemplated that the fuel cell stack comprises a plurality of identically designed repetitive units. Such repetitive units are per se known and may, for example, comprise a bipolar plate and a MEA (Membrane Electrode Assembly) as well as possibly other sealing and/or gas distribution devices.

Within the framework of the fuel cell system according to the invention it may further be contemplated that the fuel cell stack comprises at least two gas passages extending in the stacking direction of the fuel cell stack, each of said gas passages being connected to at least one orifice. Said two gas passages may, in particular, be an anode gas and an anode exhaust or waste gas passage.

In this connection it may further be contemplated that the fuel cell stack is stacked onto the media supply plate so that at least two orifices are disposed adjacent to the fuel cell stack. This solution is particularly convenient if the fuel cell stack is a fuel cell stack having an open cathode.

In this case the fuel cell stack is preferably disposed under a first cap, the two orifices disposed adjacent to the fuel cell stack opening into the space under the first cap. Said first cap may, for example, be manufactured from a ceramic material also serving to ensure the electric insulation of the fuel cell stack.

Preferably the space under the first cap is divided into a first space and a second space by the fuel cell stack, the one orifice among the orifices disposed adjacent to the fuel cell stack opening into the first space while the other orifice among the orifices disposed adjacent to the fuel cell stack opening into the second space. In this way the cathode supply air and the cathode exhaust air side are separated from each other so that the air provided for supplying the cathodes cannot flow past the fuel cell stack but actually has to penetrate it.

In so far the result is that the fuel cell stack comprises a cathode gas interface opening into the first space and a cathode waste gas interface opening into the second space. Even though the use of fuel cell stacks comprising an open cathode is considered particularly advantageous the invention is not limited thereto. It is rather also possible to provide further gas passages in the fuel cell stack via which the cathode air is supplied or discharged. Said other gas passages are then preferably also aligned with orifices in the upper surface of the media supply plate.

A particularly preferred embodiment of the fuel cell system according to the invention is characterised in that a fuel cell stack clamping device is provided which clamps at least the fuel cell stack and the media supply plate in the stacking direction. In this case it is considered particularly advantageous if the fuel cell stack clamping device provides for the required clamping during the production of the fuel cell stacks as well as during its operation so that a restraint provided exclusively for the production and possibly for the transportation of the fuel cell stack may be dispensed with.

In this connection the fuel cell stack clamping device preferably comprises a strip-like fuel cell stack clamping element surrounding at least the fuel cell stack. Said strip may, for example, be a steel strip or any other strip capable of withstanding the temperatures occurring during the operation of the fuel cell system. Without being limited thereto flat strips are particularly preferred.

In this connection embodiments in which it is contemplated that the strip-like fuel cell stack clamping element is kept pre-strained with the aid of at least one elastic element are considered particularly advantageous. As the elastic element, for example, a coil spring will qualify, it being advantageous if the biasing of said element itself may have different intensities irrespective of the particular embodiment of the elastic element. During the production of the fuel cell stack, for example, another restraint may be optimum than during its regular operation.

At least in some cases it may further be contemplated that the fuel cell stack is disposed under a second cap. If required the second cap which may, for example, be formed of a metal, may be supplemented by a base plate so that a metal shell is obtained. In this way an encapsulation of the module is possible which may, for example, serve to block the way of reformate possibly leaking from the fuel cell stack out of the system and to, for example, force said leaking reformate into the cathode exhaust air passage.

In preferred embodiments of the fuel cell system according to the invention it is further contemplated that the fuel cell stack is surrounded by an insulating material. If a second cap (or a complete shell) is provided it is preferably provided between a first cap and the insulation. Theoretically it is of course also possible to provide the second cap or the shell outside of the insulation.

In preferred embodiments of the fuel cell stack according to the invention, it is contemplated that at least some of the terminals are connected to gas passages each of which opens towards at least one orifice provided on an upper surface of the media supply plate. Preferably all the terminals are connected to at least one orifice in the upper surface of the media supply plate. In case of a fuel cell stack comprising an open cathode it is, for example, possible to use two orifices provided in the edge region for the air supply to the cathode and to provide the anode gas supply via two inner orifices disposed between these outer orifices. For this purpose at least the orifices provided for the anode gas supply may be aligned with gas passages formed inside the fuel cell stack in its stacking direction during the production of the fuel cell stack.

According to an advantageous further development of the fuel cell stack according to the invention, it is contemplated that the media supply plate comprises at least one groove provided adjacent to at least one orifice. Such a groove may, for example, be provided adjacent to the orifice provided for the supply of the cathode air which is cooler as compared to the operating temperature of the fuel cell stack. In this case the groove is provided for increasing the heat resistance between the cathode air supply area and the active area of the fuel cell stack so that as little heat as possible is transferred to the cathode air supply area. In the area of the orifice provided for discharging the cathode air at least one groove may be provided in a similar manner so that as little heat as possible is transferred to the cathode air discharge area.

In preferred embodiments of the fuel cell stack according to the invention, it is contemplated that the media supply plate comprises an upper plate comprising the orifices and a lower plate at least contributing to the formation of the gas passages. The upper plate may, in this case serve as a base plate for stacking the fuel cell stack, and the lower plate may be a underlying sheet metal part which forms the gas passages due to a corresponding design, preferably in cooperation with the upper plate.

In case of the fuel cell stack according to the invention, it may also be contemplated that the media supply plate comprises at least one aperture provided for the passage of at least one fuel cell stack clamping element. The fuel cell stack clamping element may, for example, be a steel strip the one end portion of which is attached to the media supply plate, and it may embrace the fuel cell stack and possibly a cap disposed on it so that the other end portion of the steel strip may be preliminarily retained after having been passed through the aperture. Said preliminary restraint may take place as early as during the production of the fuel cell stack, i.e. during the joining process, and then be maintained during the service life of the fuel cell stack. Thus a temporary setting which is frequently provided in the state of the art and replaced by a final setting after the integration of the fuel cell stack into the system provided for its operation may be omitted.

The method according to the invention for producing a fuel cell system comprises the following steps:
  stacking a fuel cell stack on a media supply plate;
  providing a fuel cell stack clamping device designed to restrain the fuel cell stack and the media supply plate in the stacking direction of the fuel cell stack;
  heating the fuel cell stack while it is simultaneously restrained to join the fuel cell stack.

These solutions yield the features and advantages explained in connection with the fuel cell systems according to the invention in the same or a similar manner so that the corresponding explanations are referred to avoid repetitions.

In preferred embodiments of the method according to the invention it is contemplated that the step of heating comprises a supply or discharge of at least one hot gas via at least two terminals. It is, however preferred that the hot gasses are supplied via the anode as well as via the cathode path for heating the fuel cell stack. For example, air can be guided over the cathode, and from a certain temperature below the ignition temperature of hydrogen a hydrogen/water/nitrogen mixture can be guided over the anode. Said temperature could, for example, be in the range of 400° C. to 500° C.

For the method according to the invention it is further considered particularly advantageous that a final restraint of the fuel cell stacks is effected with the aid of the fuel cell stack clamping device when it is still in its hot state due to the joining. In the simplest case the final restraint can be ensured simply by maintaining the restraint effected for joining the fuel cell stacks. If necessary it may, however, also be advantageous to subsequently adjust the biasing force bringing about the final restraint.

The invention enables a simple integration of the fuel cell stack into a system since the insulation and the restraint are preferably already present. Therefore an additional transportation restraint may usually also be omitted. The system interfaces may be variably defined in accordance with the requirements of the client, and a (subsequently) provided seal between the fuel cell stack and the system may be omitted whereby a very low safety risk is obtained. The use of a single common base plate will result in a lower weight, lower costs and to a shorter start-up time. By using a metal housing (a second cap) it may be ensured that no reformate flows into the system in an undesired manner even in the event of a lack of tightness of an anode. Thermal losses due to a transfer of heat from the fuel cell stack into the media supply plate may be at least reduced by supplying one or more grooves in the media supply plate since such grooves aggravate heat conduction.

Preferred embodiments of the invention will be described by way of example with reference to the accompanying drawings in which.

In the drawings identical or similar numerals designate identical or similar components which are, at least partly, only explained once to avoid repetitions.

Figure 1:
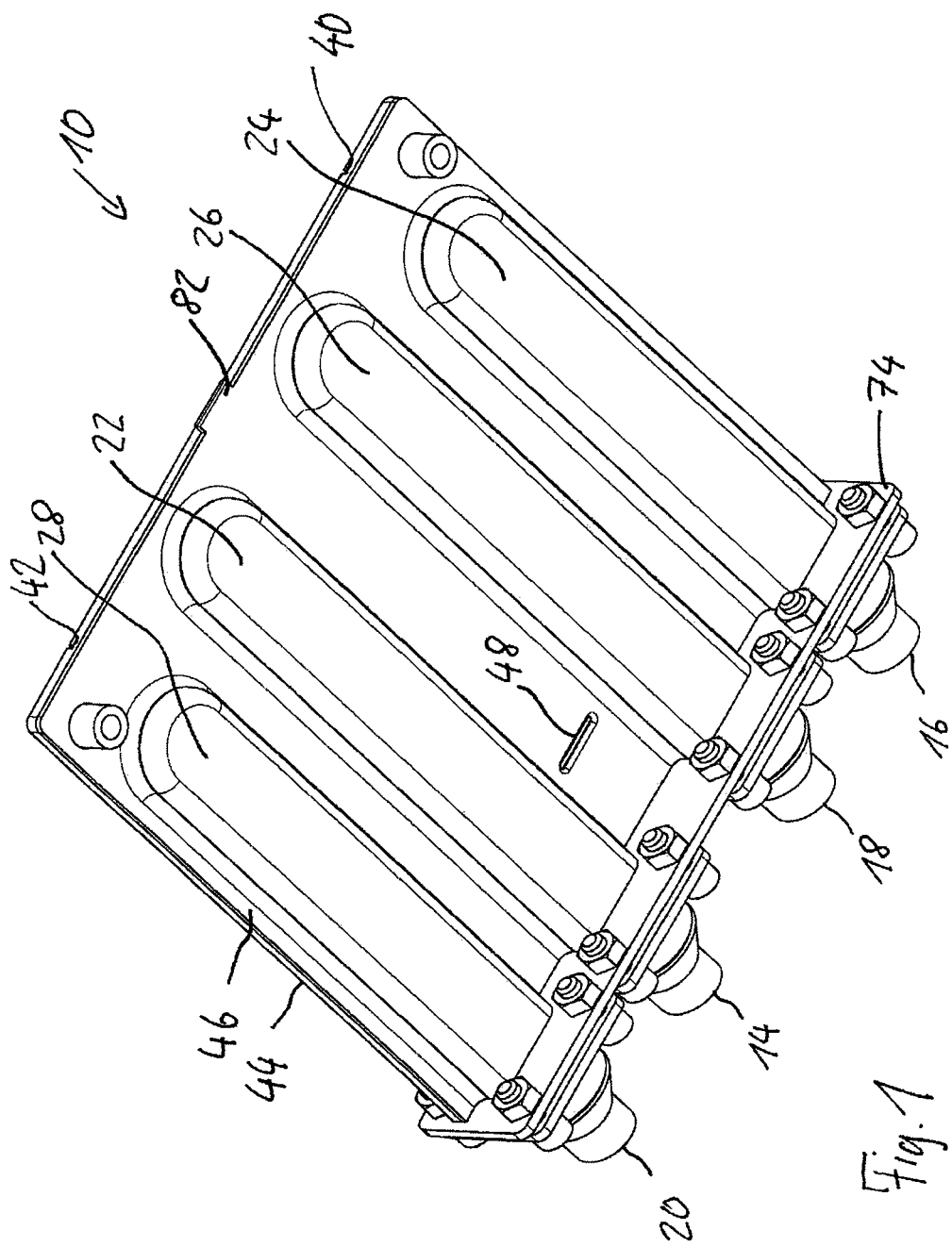
FIG. 1 is a perspective representation of an embodiment of the media supply plate according to the invention as viewed from below.
Figure 2:
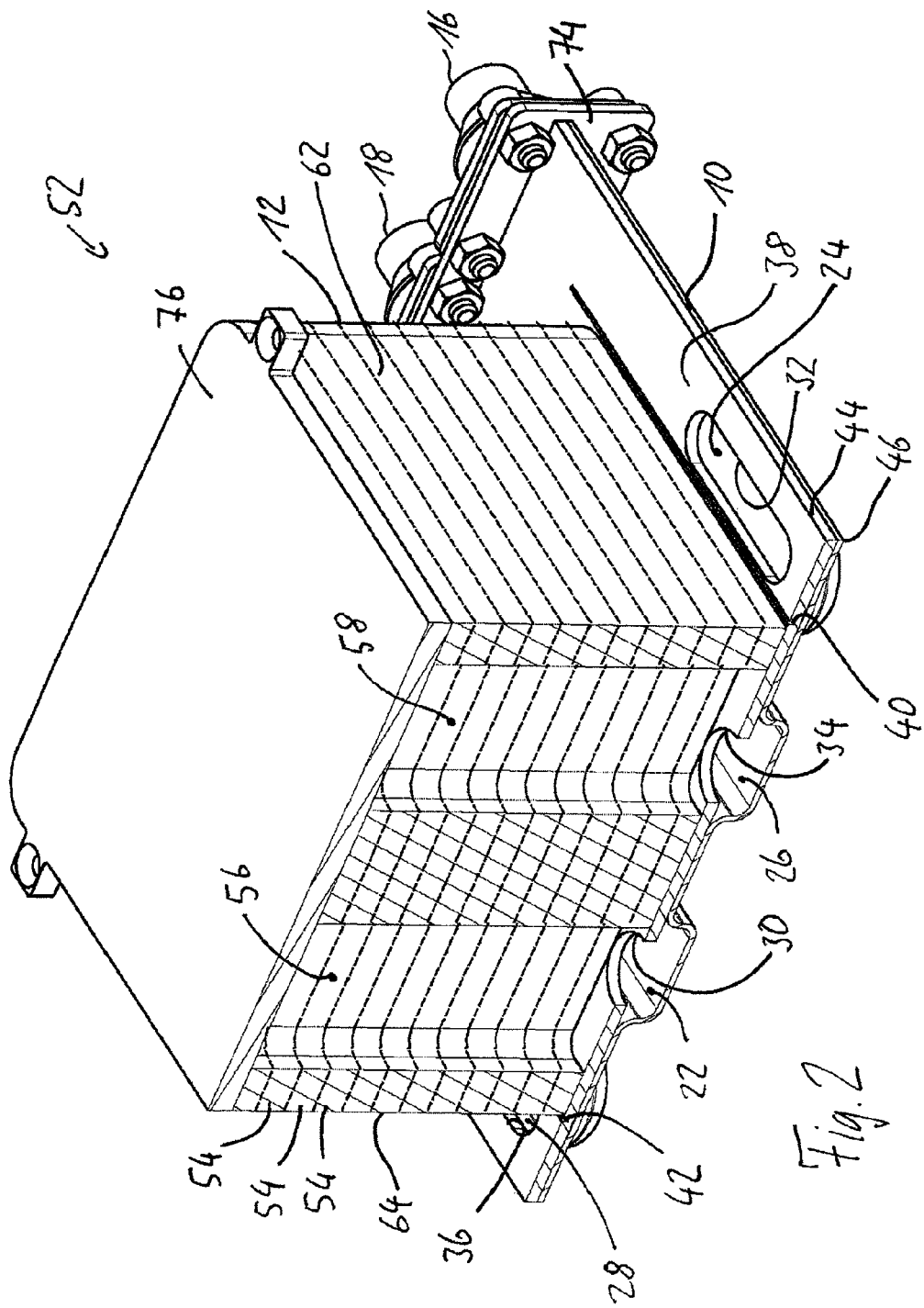
FIG. 2 is a perspective cross sectional view of an embodiment of the fuel cell system according to the invention produced in accordance with the method according to the invention.
Figure 3:
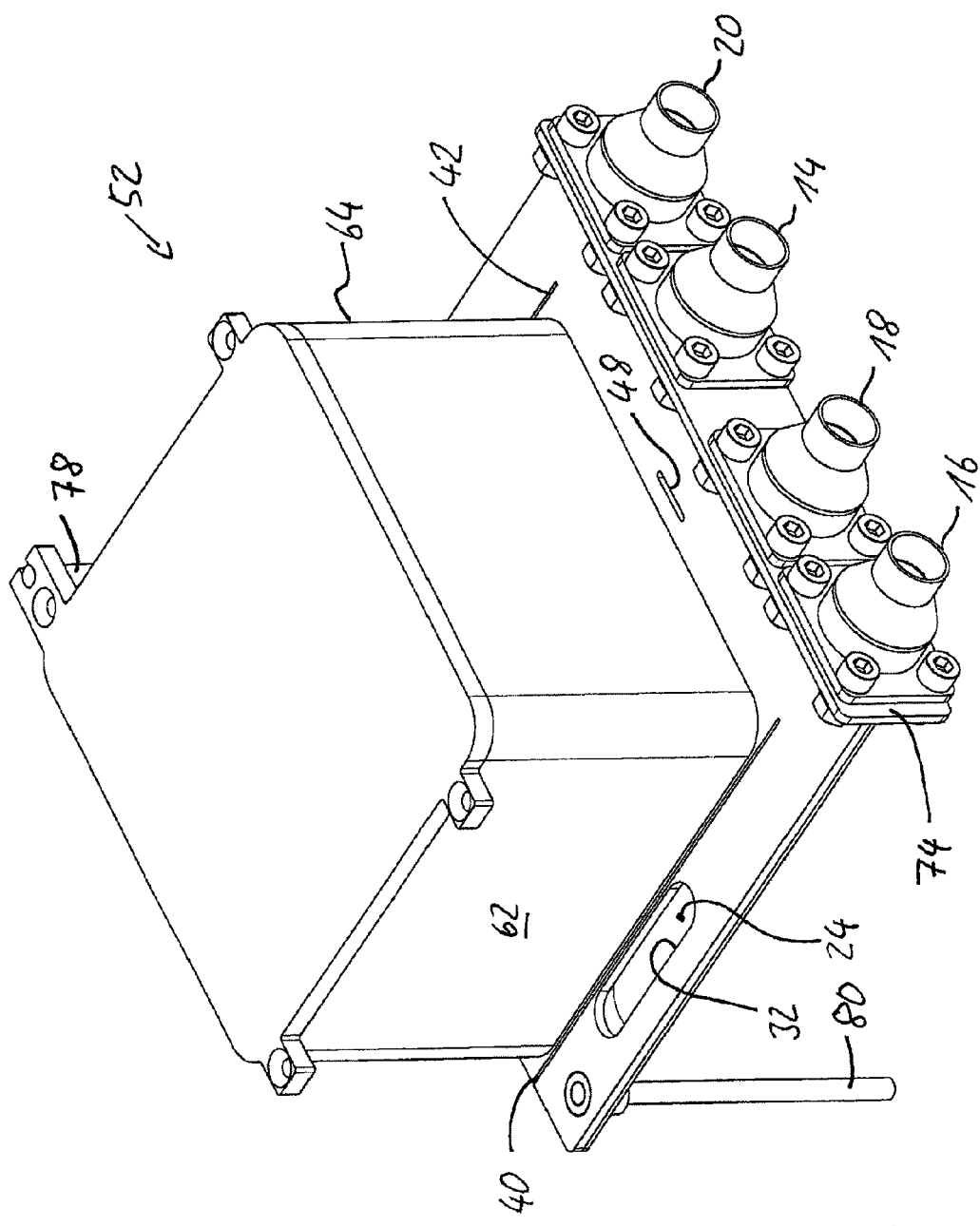
FIG. 3 is a perspective representation of the fuel cell system shown in FIG. 2.
Figure 4:
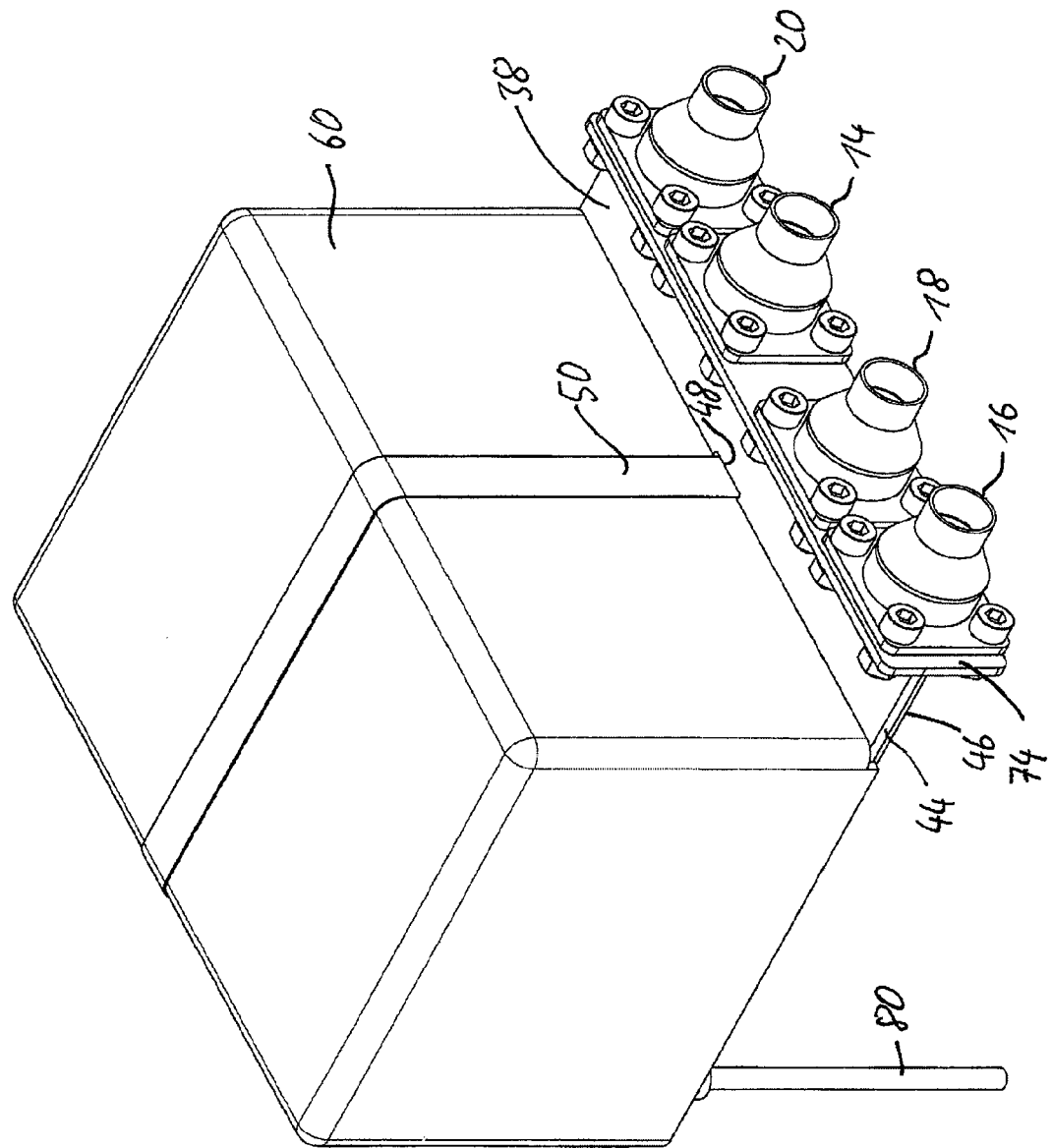
FIG. 4 is a perspective representation of the fuel cell system according to FIG. 3 with the first cap installed and the clamping strip applied.
Figure 5:
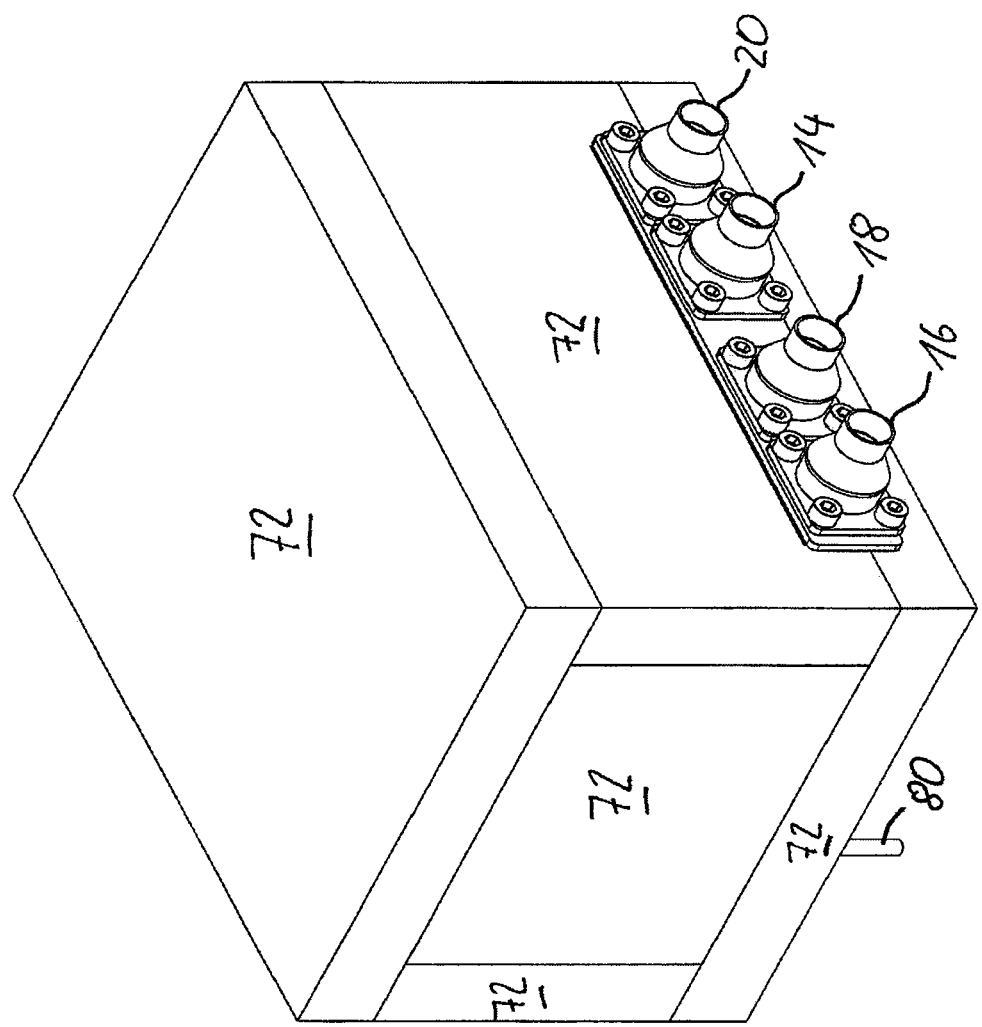
FIG. 5 is a perspective representation of the fuel cell systems according to FIG. 4 comprising an insulation surrounding the first cap.

First FIGS. 1 to 5 are referred to. The media supply plate 10 recognisable particularly in FIGS. 1 to 4 comprises an upper plate 44 and a lower plate 46. The lower plate 46 is formed so that in cooperation with the upper plate 44 gas passages 22, 24, 26, 28 are provided of which the gas passage 22 is connected to an anode gas terminal 14, the gas passage 24 is connected to a cathode gas terminal 16, the gas passage 26 is connected to an anode waste gas terminal 18 and the gas passage 28 is connected to a cathode waste gas terminal 20. The anode gas terminal 14, the cathode gas terminal 16, the anode waste gas terminal 18 and the cathode waste gas terminal 20 are respectively designed in a tubular form and attached to a flange plate 74 arranged perpendicular to the upper plate 44 and the lower plate 46. The upper plate 44, the lower plate 46 and the flange plate 74 are, in this case, connected, for example, by means of welding or soldering so that the terminals 14, 16, 18, 20 are connected to the gas passages 22, 24, 26, 28 in a gastight manner. The gas passages 22, 24, 26, 28 respectively open towards an orifice 30, 32, 34, 36 provided on the upper side 38, i.e. in the upper plate 44, of the media supply plate 10.

With the aid of the production method according to the invention a fuel cell system 52 of which the fuel cell stack 12 is directly stacked onto the media supply plate 10 can be produced on the basis of the media supply plate 10. As indicated by the dashed lines in FIG. 2 the fuel cell stack 12 comprises a plurality of repetitive units 54 comprising, in a per se known manner, a bipolar plate, a MEA as well as possibly other gas distribution devices and sealing means. In this case the repetitive units 54 comprise apertures forming gas passages 56, 58 in the stacking direction of the fuel cell stack 12, the gas passage 56 being connected to the gas passage 22 and therefore to the anode gas terminal 14 via the orifice 30. The gas passage 58 is connected to the gas passage 26 and therefore to the anode waste gas terminal 18 via the orifice 34. A hydrogenous anode gas may thus be supplied to and removed from the anode sides of the individual fuel cells via the terminals 14 and 18. On the uppermost repetitive unit 54 a cover plate 76 is provided which, on the one hand, closes the gas passages 56 and 58 and is, on the other hand, used for a voltage or current tap. For this purpose a contact rod 78 is connected to the cover plate 76 in an electrically conductive manner. The electrically insulated contact rod 78 may be lead out downwards through an orifice in the media supply plate 10. Another contact rod 80 is, in an electrically conductive manner, connected to the media supply plate 10 which, in the illustrated case, represents the mass and is therefore also used as a voltage or current tap.

The illustrated example is a fuel cell stack 12 comprising an open cathode, i.e. a cathode gas interface 62 and a cathode waste gas interface 64 are provided. The cathode gas interface 62 is disposed adjacent to the orifice 32 connected to the cathode gas terminal 16 via the gas passage 24. In a similar manner the cathode waste gas interface 64 is disposed adjacent to the orifice 36 connected to the cathode waste gas terminal 20 via the gas passage 28. Between the orifice 32 and the fuel cell stack 12 as well as between the orifice 36 and the fuel cell stack 12 a groove 40 or 42 is provided, respectively, so that as little heat as possible is transferred from the fuel cell stack 12 to the cathode gas supply area or to the cathode gas discharge area. The grooves 40, 42 bring about an increased heat resistance so that the removal of heat is at least rendered more difficult. This is of particular importance in connection with the cathode gas supply since the supplied cathode gas, generally air, usually has a lower temperature than the operating temperature of the fuel cell stacks which may, in particular, be a SOFC fuel cell stack.

After the stacking of the individual repetitive units 54 and the arrangement of the cover plate 76 during the production of the fuel cell stack 12 a first cap 60 is arranged above the fuel cell stack so that the two orifices 24, 28 disposed adjacent to the fuel cell stack 12 open into the space below the first cap 60. The space below the first cap 60 is, in this case, divided into a first space and a second space by the fuel cell stack 12, the one orifice 24 opening into the first space and the other orifice 28 opening into the second space. Therefore the cathode gas terminal 16 and the cathode waste gas terminal 20 are only connected via the fuel cell stack 12. One end of the fuel cell stack clamping element 50 provided in the form of a clamping strip comprises an orifice (not shown) so that it can be fixed to a protrusion 82 formed by the lower plate 46. The clamping strip 50 surrounds the fuel cell stack 12 as well as the first cap 60 which is dimensioned and mounted so that it can apply a force to the fuel cell stack 12 from above. For this purpose the other end of the clamping strip 50 extends through an aperture 48 in the media supply plate 10 and cooperates with a fuel cell stack clamping device 66 (not shown in FIGS. 1 to 5). For joining the fuel cell stack, i.e. in particular for melting on the glass solder seals provided between the individual repetitive units 54 and between the fuel cell stack 12 and the media supply plate 10, hot gasses are supplied and removed via the terminals 14, 16, 18, 20. Like during the later operation of the fuel cell system 52 the allocation of the terminals 14, 16, 18, 20 also decides whether the fuel cell stack 12 is driven in the unidirectional flow mode or in the counter-flow mode with respect to the cathode gas and the anode gas flow during the joining process of the fuel cell stack 12, a counter-flow mode being obtained with the illustrated allocation.

For joining the fuel cell stack 12 hot cathode air is supplied via the cathode gas terminal 16, said air being discharged via the cathode waste gas terminal 20. From a certain temperature of, for example, 400° C. to 500° C., which is below the ignition temperature of hydrogen, onwards a hydrogen/water/nitrogen mixture is supplied via the anode gas terminal 14 and discharged via den anode waste gas terminal 18 after having been discharged by the fuel cell stack 12. Incidentally a force acting from the top to the bottom is applied to the fuel cell stack 12 via the clamping strip 50 and the first cap 60. After the joining process the fuel cell stack 12 is surrounded by insulation material 72 provided outside of the first cap 60 to ensure the best possible thermal insulation. If required a metal housing (not shown in FIGS. 1 to 5) comprising a second cap may be provided to prevent reformate leaking from the fuel cell stack 12 from flowing into other areas of the system in an undesired manner. Instead such reformate possibly leaking in an undesirable manner may be forced into the cathode exhaust air passage. Embodiments in which a second cap is disposed between the insulation 72 and the first cap 60 as well as embodiments in which the insulation 72 is surrounded by a second cap are feasible, the second cap respectively being completed by a corresponding bottom to form a complete housing.

There may be cases in which the height of the fuel cell stack 12 (also) changes slightly during joining or during the subsequent operation due to the relatively high temperature variation experienced, for example, in SOFC systems. Even in such cases the tightness between the first cap 60 and the media supply plate 10 should generally be given. With respect to the representation shown in FIG. 4 the left (recognisable in FIG. 4), the rear and the right wall of the first cap 60 surround the media supply plate 10 in an abutting and therefore sealing manner for this purpose so that a slight upwards or downwards movement of the first cap 60 will not result in any untightness. To ensure tightness even between the front wall provided adjacent to the aperture 48 and resting on the media supply plate 10 and the media supply plate 10 a heat resistant, elastically deformable seal (not shown) may be provided between the front wall and the media supply plate 10 if required. Such a seal may, for example, be a gas-tight fibre mat having the corresponding heat resistance. Should unforeseen problems relating to the tightness occur in other positions comparable seals may, of course, also be employed in these positions.

Figure 6:
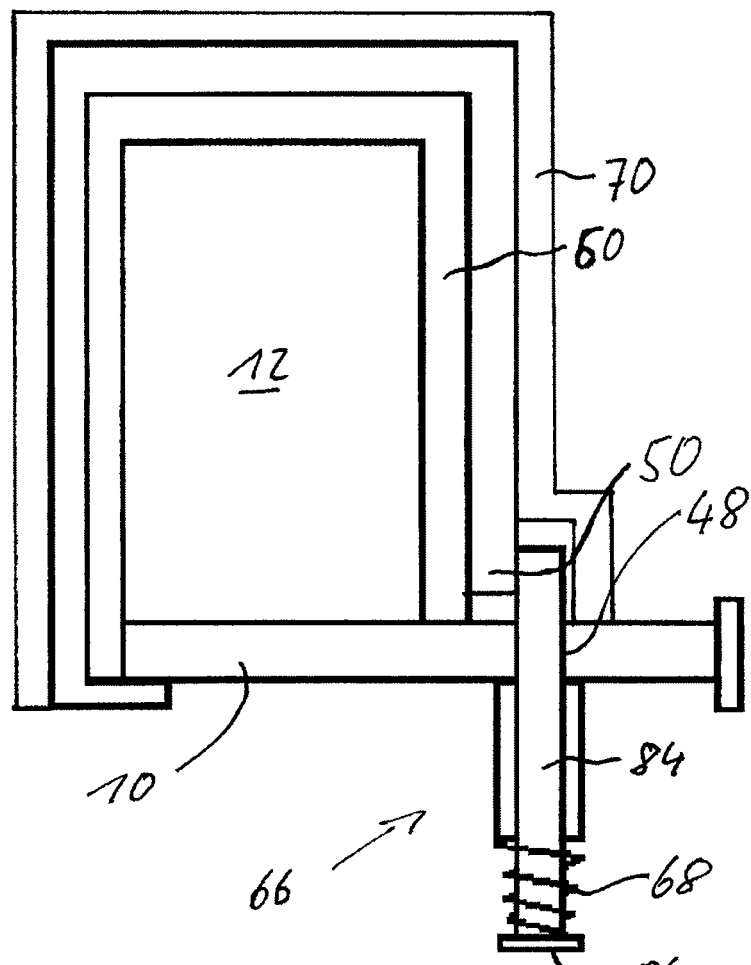
FIG. 6 is a schematic cross sectional view of a fuel cell system according to the invention which, in particular, schematically shows a possible type of restraint.

FIG. 6 shows a schematic cross sectional view of a fuel cell system according to the invention which, in particular, schematically illustrates a possible type of retainment. According to the illustration shown in FIG. 6 a fuel cell stack 12 disposed on a media supply plate 10 is surrounded by a first cap 60. The fuel cell stack 12 and the first cap 60 are embraced by a clamping strip 50 the one end of which catches a fuel cell stack clamping device 66 while the other end is attached to the media supply plate 10. The fuel cell stack clamping device 66 comprises a pin 84 connected to the clamping strip 50 and pressed down by a spring 68 so that a retainment of the fuel cell stack 12 is obtained which is determined by the spring 68. To adjust the retaining force a stopper 86 may be turned or screwed into or out of the pin 84 like a screw. The fuel cell stack clamping device 66 may be employed in connection with the fuel cell stack clamping element 50 during the production (joining) of the fuel cell stack 12 as well as during its regular operation. It is obvious that the fuel cell stack clamping device 66 shown in FIG. 6 is depicted in a very schematic manner and in an unfavourable position. In realistic embodiments a fuel cell stack clamping device 66 rotated by 90° may be disposed flatly on the bottom side of the media supply plate 10 and/or accommodated in a corresponding recess. Preferably the overall arrangement is so that the media supply plate 10 has a flat bottom surface.

The features of the invention disclosed in the above description, in the drawings as well as in the claims may be important for the realisation of the invention individually as well as in any combination.

The invention claimed is:

1. A fuel cell system comprising a media supply plate and a fuel cell stack directly stacked onto the media supply plate,
   wherein the media supply plate comprises at least one anode supply gas terminal, at least one cathode supply gas terminal, at least one anode waste gas terminal and at least one cathode waste gas terminal,
   wherein the terminals are each respectively connected to gas passages, each of which gas passages opening into at least one orifice proved on an upper side of the media supply plate,
   wherein the fuel cell stack is stacked onto the media supply plate so that the fuel cell stack partially covers the media supply plate,
   wherein gas passages connected to the anode supply and waste gas terminals form an anode pair, wherein gas passages connected to the cathode supply and waste gas terminals form a cathode pair, wherein the orifices of one of said anode and cathode pair is located in the area of the media supply plate covered by the fuel cell stack and the orifices of the other of said anode and cathode pair is located in the area of the media supply plate adjacent to the area covered by the fuel cell stack,
   wherein the fuel cell stack is disposed under a first cap that is mounted to the media supply plate,
   wherein the space under the first cap is divided into a supply space and a waste gas return space by the fuel cell stack, and
   wherein the at least one orifice of the anode or cathode pair that is located in the area of the media supply plate adjacent to the area covered by the fuel cell stack opens into the supply space, and the at least one other orifice of the anode and cathode pair that is located in the area of the media supply plate adjacent to the area covered by the fuel cell stack opens into the waste gas return space.

2. A fuel cell system comprising a media supply plate and a fuel cell stack directly stacked onto the media supply plate,
   wherein the media supply plate comprises at least one anode supply gas terminal, at least one cathode supply gas terminal, at least one anode waste gas terminal and at least one cathode waste gas terminal,
   wherein the terminals are each respectively connected to gas passages, each of which gas passages opening into at least one orifice proved on an upper side of the media supply plate,
   wherein the fuel cell stack is stacked onto the media supply plate so that the fuel cell stack partially covers the media supply plate,
   wherein gas passages connected to the anode supply and waste gas terminals form an anode pair, wherein gas passages connected to the cathode supply and waste gas terminals form a cathode pair, wherein the orifices of one of said anode and cathode pair is located in the area of the media supply plate covered by the fuel cell stack and the orifices of the other of said anode and cathode pair is located in the area of the media supply plate adjacent to the area covered by the fuel cell stack, wherein the fuel cell stack is disposed under a first cap that is mounted to the media supply plate, and wherein the space under the first cap is divided into a supply space and a waste gas return space by the fuel cell stack, wherein one orifice of the anode or cathode pair that is located in the area of the media supply plate adjacent to the area covered by the fuel cell stack opens into the supply space, and the other orifice of the anode and cathode pair that is located in the area of the media supply plate adjacent to the area covered by the fuel cell stack opens into the waste gas return space, wherein the at least one orifice of the cathode supply gas passage opens into the supply space and the at least one other orifice of the cathode waste gas passage opens into the waste gas return space.

3. The fuel cell system of claim 1, further comprising a fuel cell stack clamping device which retains at least the fuel cell stack and the media supply plate in the stacking direction.

4. The fuel cell system of claim 1, wherein the fuel cell stack is disposed under a second cap.

5. The fuel cell system of claim 1, wherein the fuel cell stack is surrounded by an insulating material.

6. The fuel cell system of claim 1, wherein the media supply plate further comprises an upper plate provided with the orifices and a lower plate at least contributing to the formation of the gas passages.

7. A method for the production of a fuel cell system according to claim 1, wherein said method comprises the following steps:
    stacking a fuel cell stack onto a media supply plate, in particular a media supply plate of claim 1;
    retaining the fuel cell stack with a fuel cell stack clamping device designed to retain the fuel cell stack and the media supply plate in the stacking direction of the fuel cell stack; and
    heating the fuel cell stack to join the fuel cell stack while at the same time retaining it with the fuel cell stack clamping device.

8. The method of claim 7, wherein the heating step comprises a supplying and discharging at least one hot gas via at least two terminals.

9. The method of claim 7, wherein a final retaining of the fuel cell stack is effected in its still hot state after joining and with the aid of the fuel cell stack clamping device.

10. The fuel cell according to claim 1, wherein the gas passages are tubular.

* * * * *